(12) United States Patent
Waldner

(10) Patent No.: US 12,480,583 B1
(45) Date of Patent: Nov. 25, 2025

(54) SYSTEM FOR SELECTIVELY CLOSING A FLUID CHANNEL

(71) Applicant: Jason J. Waldner, White, SD (US)

(72) Inventor: Jason J. Waldner, White, SD (US)

( * ) Notice: Subject to any disclaimer, the term of this patent is extended or adjusted under 35 U.S.C. 154(b) by 0 days.

(21) Appl. No.: 18/592,601

(22) Filed: Mar. 1, 2024

(51) Int. Cl.
| | |
|---|---|
| *F16K 3/02* | (2006.01) |
| *E02B 7/28* | (2006.01) |
| *E02B 7/36* | (2006.01) |
| *F16K 3/316* | (2006.01) |

(52) U.S. Cl.
CPC .............. *F16K 3/0281* (2013.01); *E02B 7/28* (2013.01); *E02B 7/36* (2013.01); *F16K 3/0254* (2013.01); *F16K 3/316* (2013.01)

(58) Field of Classification Search
CPC ...... F16K 3/0281; F16K 3/0254; F16K 3/316; E02B 7/26; E02B 7/28; E02B 7/36
USPC .......... 251/326–329, 203, 284; 405/103–106
See application file for complete search history.

(56) References Cited

U.S. PATENT DOCUMENTS

| | | | | |
|---|---|---|---|---|
| 105,027 A | * | 7/1870 | Belfield | F16K 27/067 |
| | | | | 251/266 |
| 542,169 A | * | 7/1895 | Melville | B63B 19/00 |
| | | | | 49/210 |
| 544,425 A | * | 8/1895 | Bruce et al. | E02B 7/42 |
| | | | | 405/106 |
| 1,482,836 A | * | 2/1924 | Brubaker | F16K 3/184 |
| | | | | 405/106 |
| 2,947,511 A | * | 8/1960 | Mcinnes | F16K 31/122 |
| | | | | 251/367 |
| 3,760,593 A | * | 9/1973 | Whipps | E02B 7/28 |
| | | | | 251/266 |
| 4,524,950 A | | 6/1985 | Vitas | |
| 5,197,512 A | | 3/1993 | Lev | |
| 5,205,317 A | | 4/1993 | Neuerberg | |
| 5,427,353 A | * | 6/1995 | Lewis | E21B 21/106 |
| | | | | 251/76 |
| 8,348,234 B2 | * | 1/2013 | Duelli | F16K 3/186 |
| | | | | 251/328 |
| 8,820,711 B2 | * | 9/2014 | Mikesell | F16K 3/0227 |
| | | | | 49/495.1 |
| 9,845,890 B2 | | 12/2017 | Paez | |
| 11,300,213 B1 | | 4/2022 | Nguyen | |

(Continued)

FOREIGN PATENT DOCUMENTS

| | | |
|---|---|---|
| GB | 2340916 | 3/2000 |
| WO | 2008007567 | 1/2008 |

*Primary Examiner* — John Bastianelli
(74) *Attorney, Agent, or Firm* — Jeffrey A. Proehl; Woods Fuller Shultz & Smith PC

(57) ABSTRACT

A system for selectively closing a fluid flow channel may include a gate apparatus with a gate structure and a guide frame assembly guiding movement of the gate structure between closed and open positions. The guide frame assembly may define a passage opening and include a gate threshold with a threshold plate having an opening perimeter forming the passage opening. The opening perimeter may be formed by an edge of the threshold plate, and the opening perimeter may have a lower perimeter portion. The gate structure may have a gate plate with a perimeter edge including a lower edge portion. The lower edge portion of the gate plate may bypass the lower perimeter portion of the threshold plate when the gate structure moves toward the closed position to form a first shear point to shear any plant material extending through the passage opening.

18 Claims, 11 Drawing Sheets

(56) References Cited

U.S. PATENT DOCUMENTS

| | | | |
|---|---|---|---|
| 11,499,644 B2 | 11/2022 | Nguyen | |
| 2006/0219969 A1* | 10/2006 | Young | F16K 3/0227 251/203 |
| 2011/0220828 A1* | 9/2011 | Kennedy | F16K 3/0218 251/328 |

* cited by examiner

SYSTEM FOR SELECTIVELY CLOSING A FLUID CHANNEL

BACKGROUND

Field

The present disclosure relates to channel closures and more particularly pertains to a new system for selectively closing a fluid channel that provides an enhanced ability to handle obstructions to the closure of the gate of the system.

SUMMARY

In aspects, the present disclosure relates to a system for selectively closing a fluid flow channel. The system may comprise a gate apparatus for selectively closing off flow in the fluid flow channel. The gate apparatus may comprise a gate structure and a guide frame assembly guiding movement of the gate structure between a closed position and an open position, with the guide frame assembly defining a passage opening through which fluid in the fluid flow channel is selectively permitted to flow. The guide frame assembly may form a track defining a guide path of movement for the gate structure. The guide frame assembly may be elongated along the track, and the frame assembly may include a gate threshold located toward a bottom end of the guide frame assembly. The gate threshold may include a threshold plate defining the passage opening, and the threshold plate may have an opening perimeter forming the passage opening. The opening perimeter may be formed by an edge of the threshold plate, and the opening perimeter may have a lower perimeter portion. The gate structure may be moveable on the track of the guide frame assembly along the guide path of movement between the closed position and the open position. The gate structure may include a gate plate having a perimeter edge having a lower edge portion, and a gate stem extending from the gate plate along at least a portion of the track. The lower edge portion of the perimeter edge of the gate plate may bypass the lower perimeter portion of the edge of the threshold plate forming the opening perimeter when the gate structure moves toward the closed position to form a first shear point to shear any plant material extending through the passage opening when the gate structure is moved toward the closed position.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
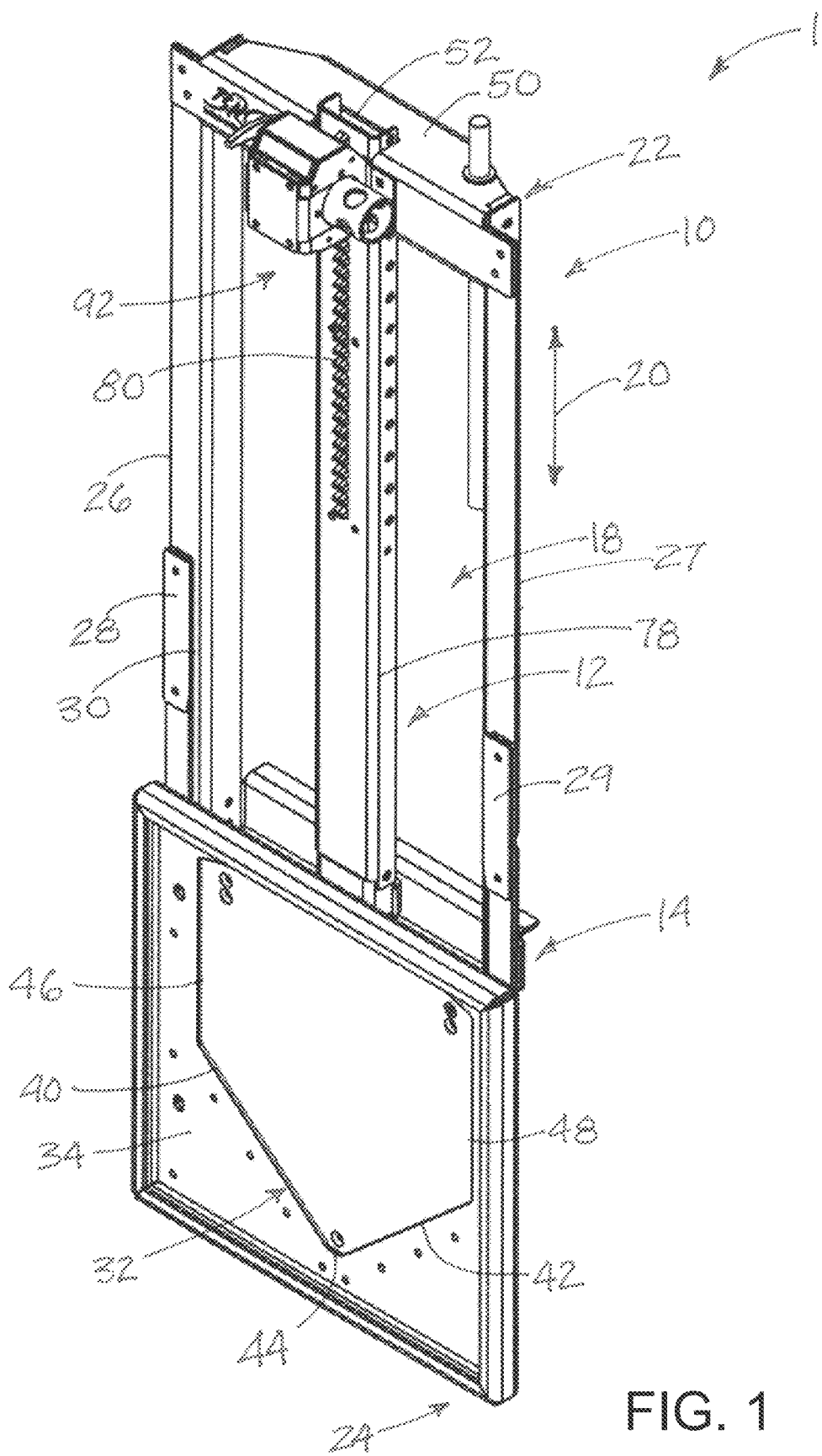
FIG. 1 is a schematic perspective view of a new system for selectively closing a fluid channel, shown with the gate structure in the closed position, according to the present disclosure.

With reference now to the drawings, and in particular to FIGS. 1 through 11 staff thereof, a new system for selectively closing a fluid channel embodying the principles and concepts of the disclosed subject matter will be described.

The applicant has recognized the problems presented by material extending through the threshold of a flow gate apparatus when it is desired to close the gate valve apparatus, and the flow gate apparatus may be wholly or partially blocked from closing and stopping fluid flow through the valve apparatus by the material in the threshold. For example, in the case of gate apparatus utilized to selectively close off the flow in an irrigation canal in an agricultural field, plant material may become detached from the ground surface and move along the canal, and some of the material can become lodged in the threshold opening of the gate apparatus. The presence of this plant material in the threshold opening can prevent the gate apparatus from fully closing, and therefore permit water to continue to move through the gate apparatus even when the apparatus is sought to be closed.

The applicant has developed a system including a gate apparatus which, in embodiments, facilitates the cutting or severing of plant material extending across the threshold of the gate, such as grasses and twigs and small branches, when the gate is moved from an open condition to a closed condition.

In aspects, the disclosure relates to a system 1 for selectively closing a fluid flow channel, such as an irrigation canal. The system 1 may comprise a gate apparatus 10 for selectively closing off flow in the flow channel 2. The gate apparatus 10 may include a gate structure 12 and a guide frame assembly 14 for guiding movement of the gate structure between a closed position and an open position. The guide frame assembly 14 may define a passage opening 16 which may be in communication with the flow channel 2. The closed position of the gate structure may be characterized by the gate structure 12 substantially blocking a flow of fluid through the passage opening 16, and the open position may be characterized by the gate structure being at least partially removed from closing the opening 16 and thus not presenting a significant blockage to fluid flow through the opening 16.

The guide frame assembly 14 may form a track 18 that defines a guide path of movement for the gate structure 12. The frame assembly 14 may be elongated to elongate the track in a longitudinal direction 20 of the guide frame assembly, and the guide path of movement may extend in the longitudinal direction. The longitudinal direction may be oriented in a substantially vertical direction when the gate apparatus 10 is oriented for use, and the guide frame assembly 14 may have a top end 22 and a bottom end 24. In embodiments, the guide frame assembly 14 may include a pair of side members 26, 27 that may be laterally spaced with respect to each other, and the track 18 may be being positioned between the side members. An auxiliary guide plate 28, 29 may be mounted on each of the side members 26, 27 respectively, and collectively each of the auxiliary guide plates and the associated side member may define a guide channel 30.

The guide frame assembly 14 may also include a gate threshold 32 located toward the bottom end 24 of the guide frame assembly. The gate threshold 14 may have the passage opening 16. The gate threshold 32 may include a threshold plate 34 which defines the passage opening. The threshold plate 34 may have an opening perimeter 36 that forms the passage opening, and the opening perimeter may be formed by an edge 38 of the threshold plate.

The opening perimeter 36 may have a pair of lower perimeter portions 40, 42, and the lower perimeter portions may converge at a bottom 44 of the passage opening. The lower perimeter portions may extend downwardly and inwardly when the apparatus 10 is oriented for use. In some advantageous embodiments, the lower perimeter portions 40, 42 may be linear or straight in shape, and may substantially converge at an angular point of convergence, or a slightly blunted point of convergence. The opening perimeter 36 may have side perimeter portions 46, 48 which may be laterally spaced from each other and may be oriented substantially parallel to each other, and also may be oriented substantially vertically when the apparatus 10 is oriented for use.

The guide frame assembly 14 may further include a cross member 50 that extends between the side members 26, 27. The cross member 50 may be positioned at the top end 22 of the guide frame assembly. The cross member 50 may also have a stem aperture 52 which may be substantially centered between the side members.

Figure 2:
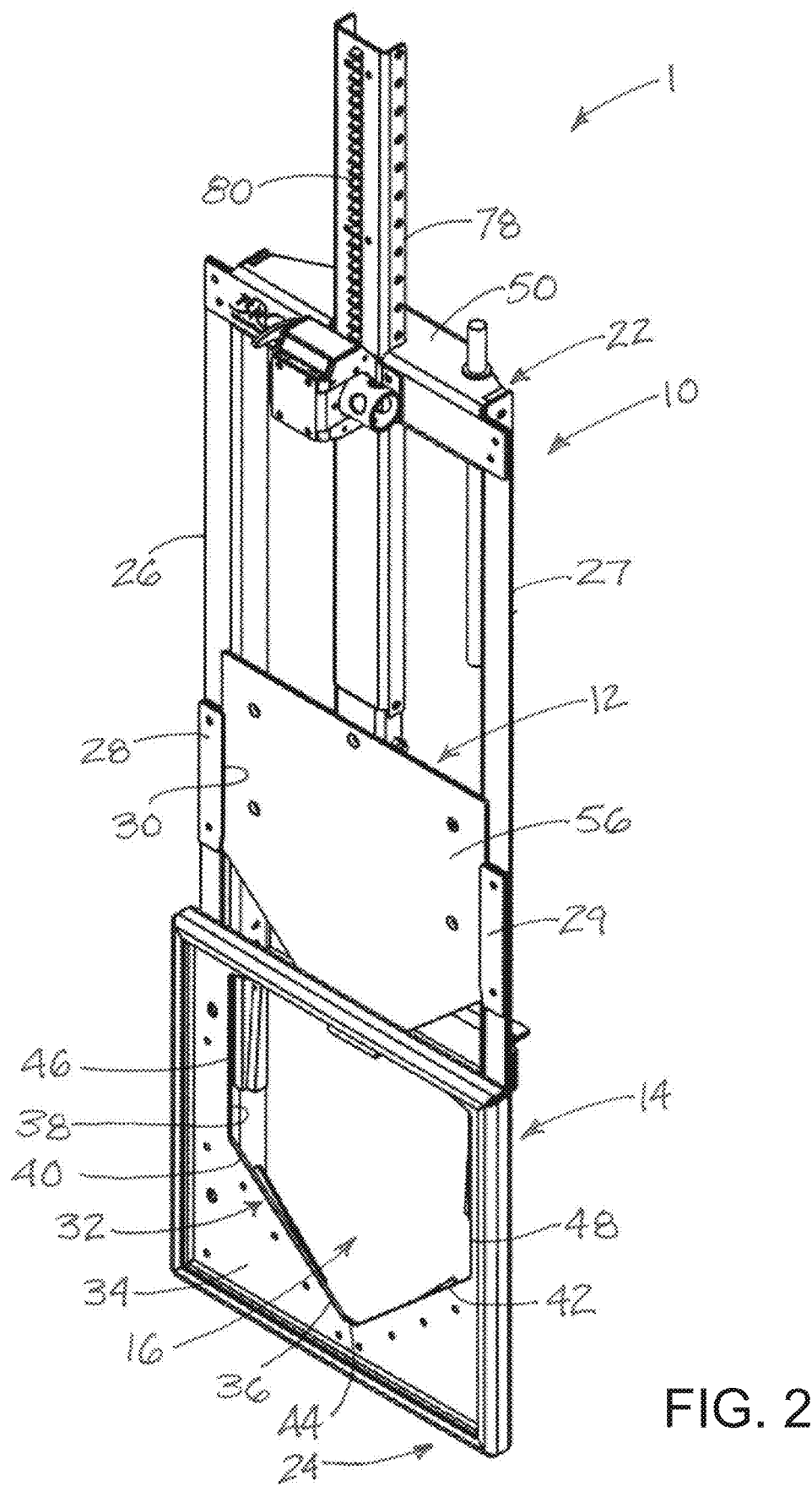
FIG. 2 is a schematic perspective view of the system, shown with the gate structure in the open position, according to the present disclosure.
Figure 3:
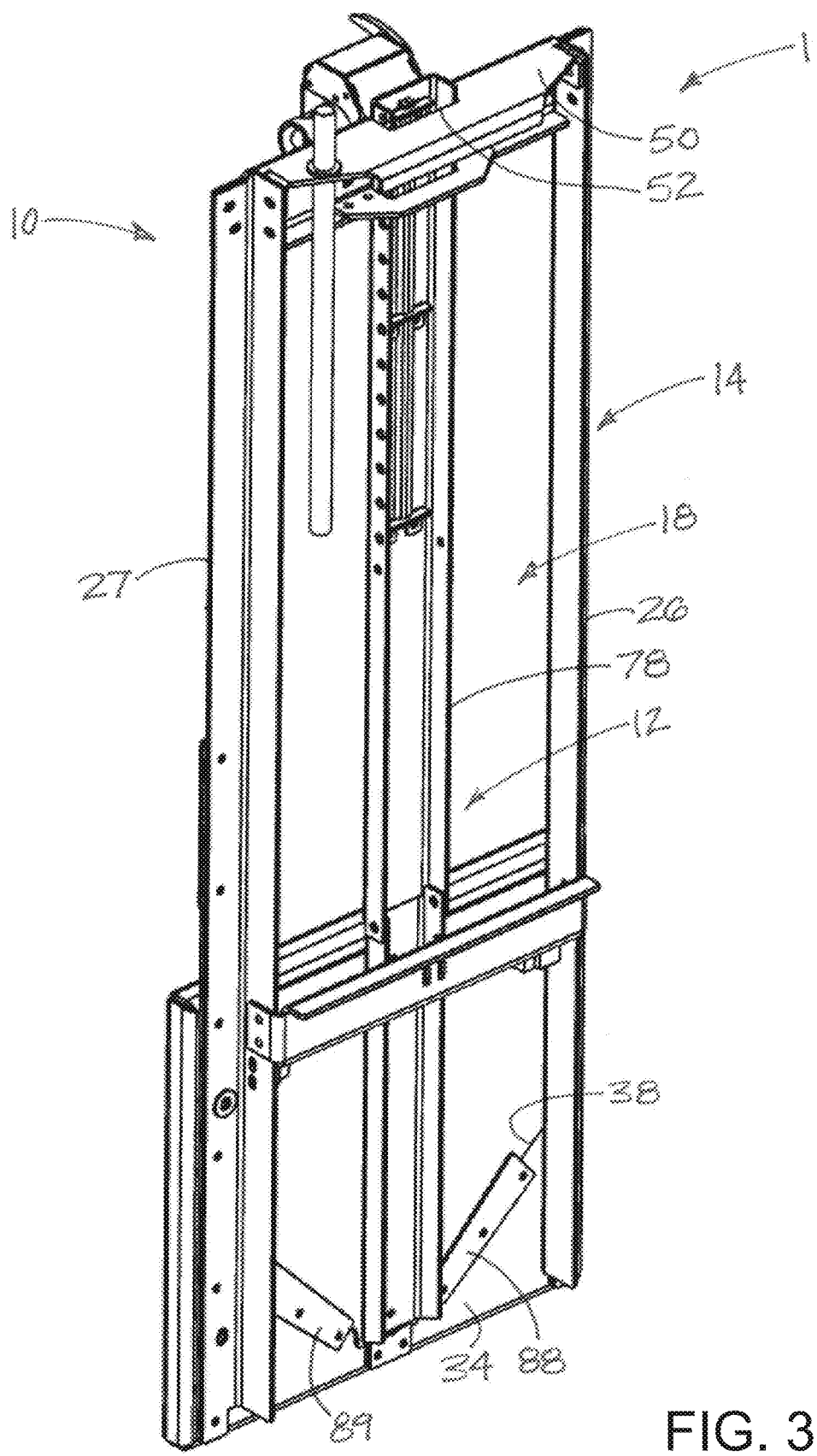
FIG. 3 is a schematic rear perspective view of the system, shown with the gate structure in the closed position, according to the present disclosure.
Figure 4:
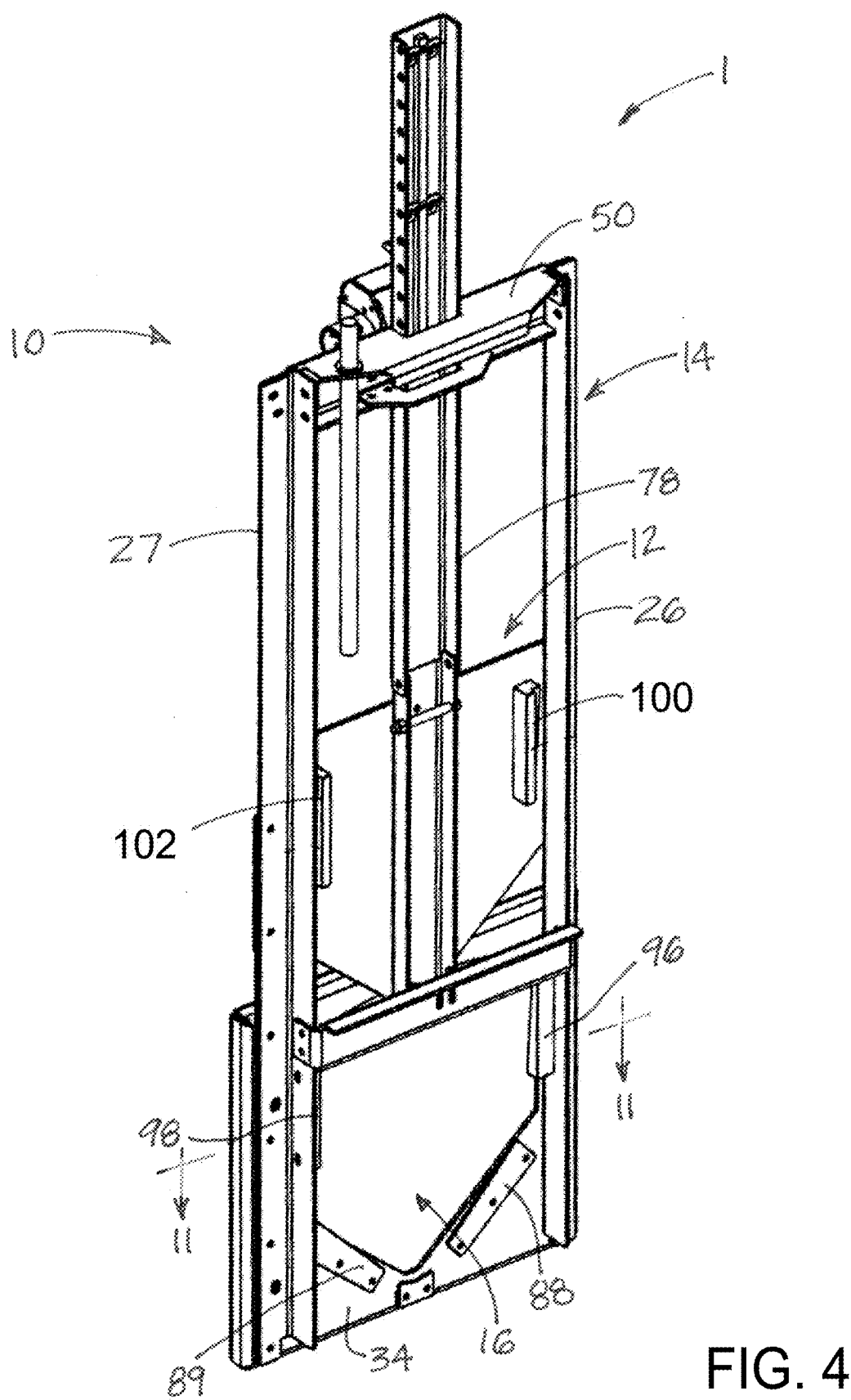
FIG. 4 is a schematic rear perspective view of the system, shown with the gate structure in the open position, according to the present disclosure.
Figure 5:
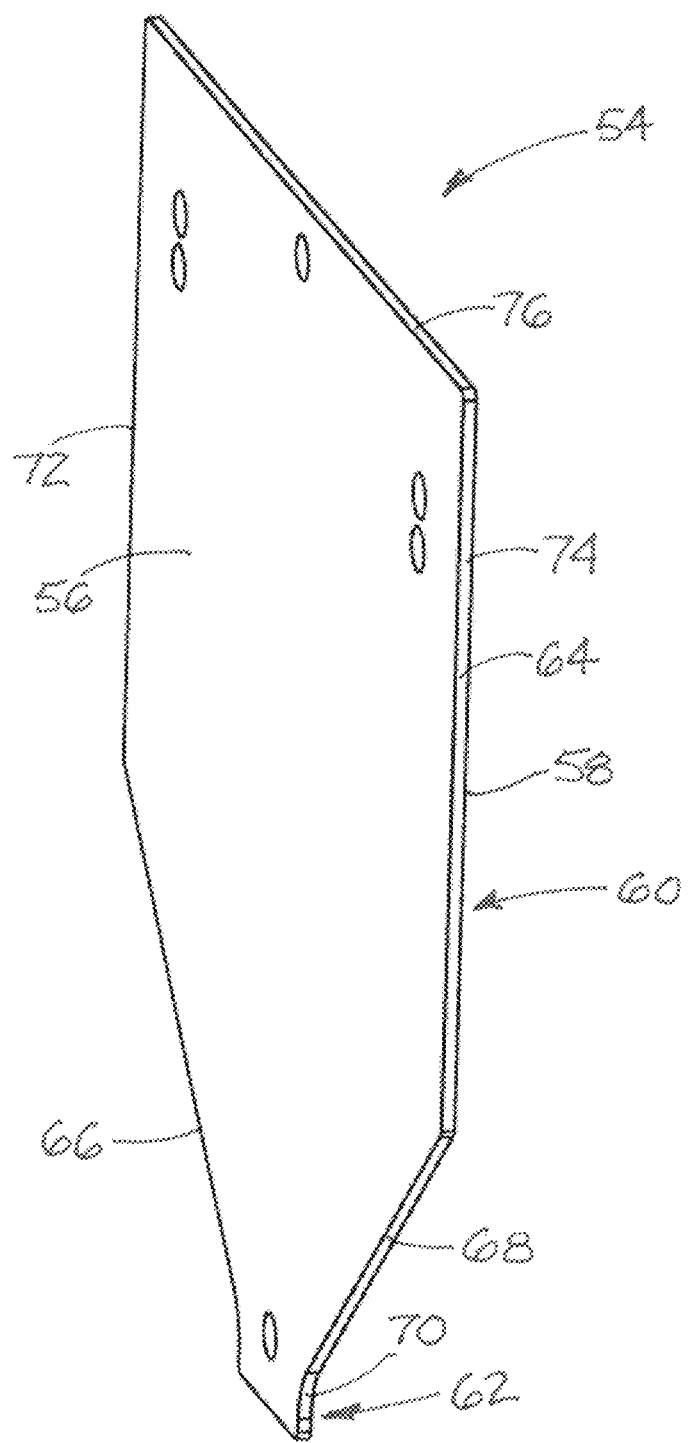
FIG. 5 is a schematic perspective view of the gate plate of the gate structure isolated from other elements of the system, according to an illustrative embodiment.

In general, the gate structure 12 is moveable along the track 18 of the guide frame assembly, and is movable along the guide path of movement between the closed position (e.g., see FIGS. 1 and 3) and the open position (e.g., see FIGS. 2 and 4). In more detail, the gate structure 12 may include a gate plate 54 which has a pair of opposite faces 56, 58 that may be substantially planar faces. In some embodiments, the gate plate 54 may have a primary portion 60 and a tab portion 62 which extends from the primary portion. The gate plate 54 may have a perimeter edge 64, and the edge may have a plurality of perimeter edge portions. In the illustrative embodiments, such as shown in FIG. 5, the perimeter edge portions may include a pair of lower edge portions 66, 68 which may converge toward each other at the bottom of the gate plate. The lower edge portions 66, 68 may be linear and straight, and may be similar in orientation to the orientations of the lower perimeter portions 40, 43 of the opening perimeter 36. In some embodiments, the perimeter edge portions may include a tab-defining edge portion 70 which defines the tap portion 62 of the gate plate, and may be positioned between the lower edge portions, such as at the apex of the plate perimeter. The perimeter edge may also a pair of side edge portions 72, 74, which may be positioned in the guide channels 30. The perimeter edge 64 may also include a top edge portion 76. Illustratively, the top edge portion 76 and the side edge portions 72, 74 may be linear in shape, and the top may be oriented perpendicular to the sides.

The gate structure 12 may include a gate stem 78 which extends from the gate plate 54 along at least a portion of the track 18. The gate stem 78 may be mounted on the gate plate 54, and may extend to the cross member 50 of the gate frame assembly. The gate stem 78 may further extend through the stem aperture 52 of the cross member. Significantly, embodiments of the gate stem 78 may have a toothed rack 80 that extends along at least a portion of the length of the elongated gate stem.

Figure 6:
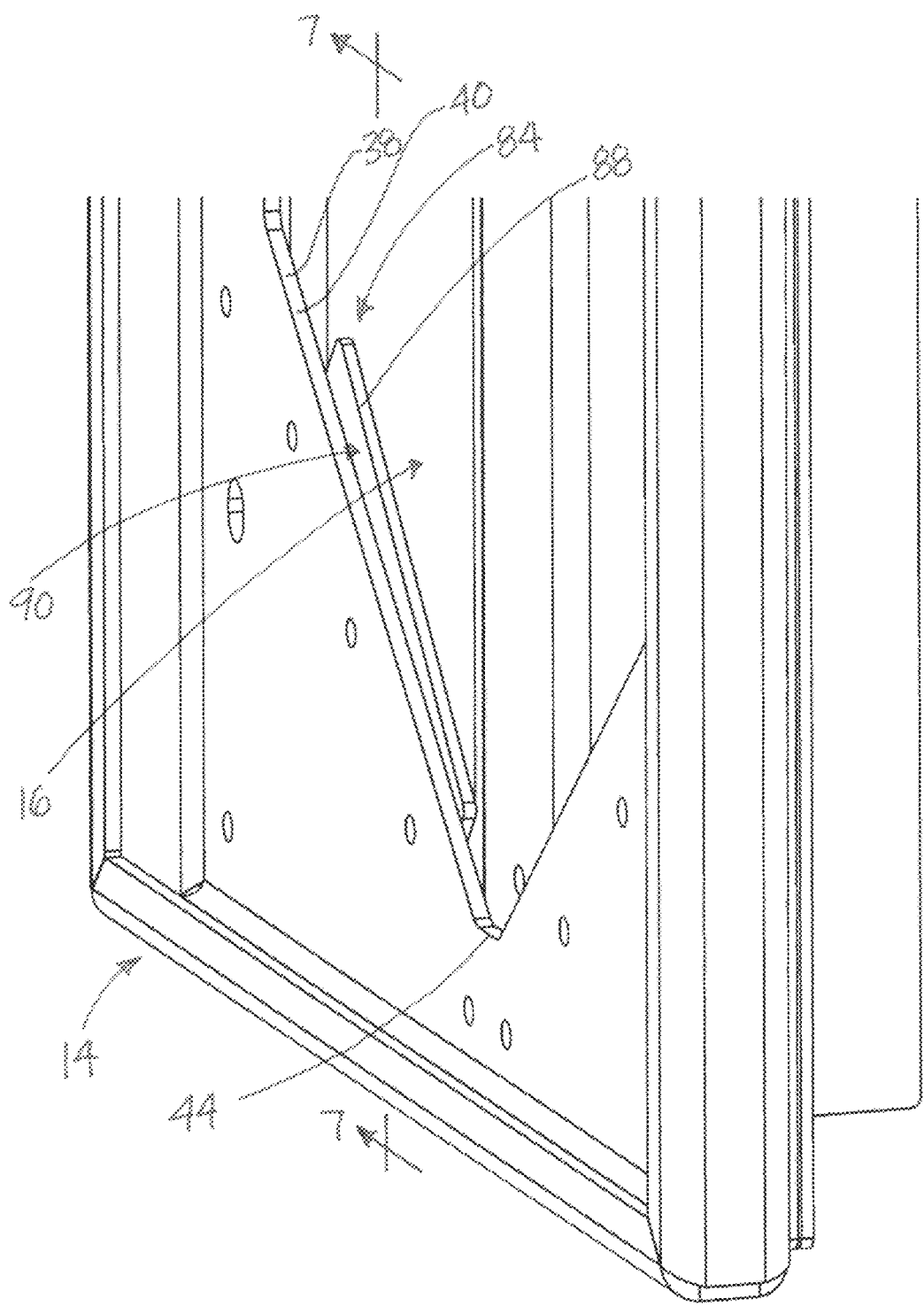
FIG. 6 is a schematic perspective view of a lower portion of the guide frame assembly, with the gate structure in the open position, according to an illustrative embodiment.
Figure 7:
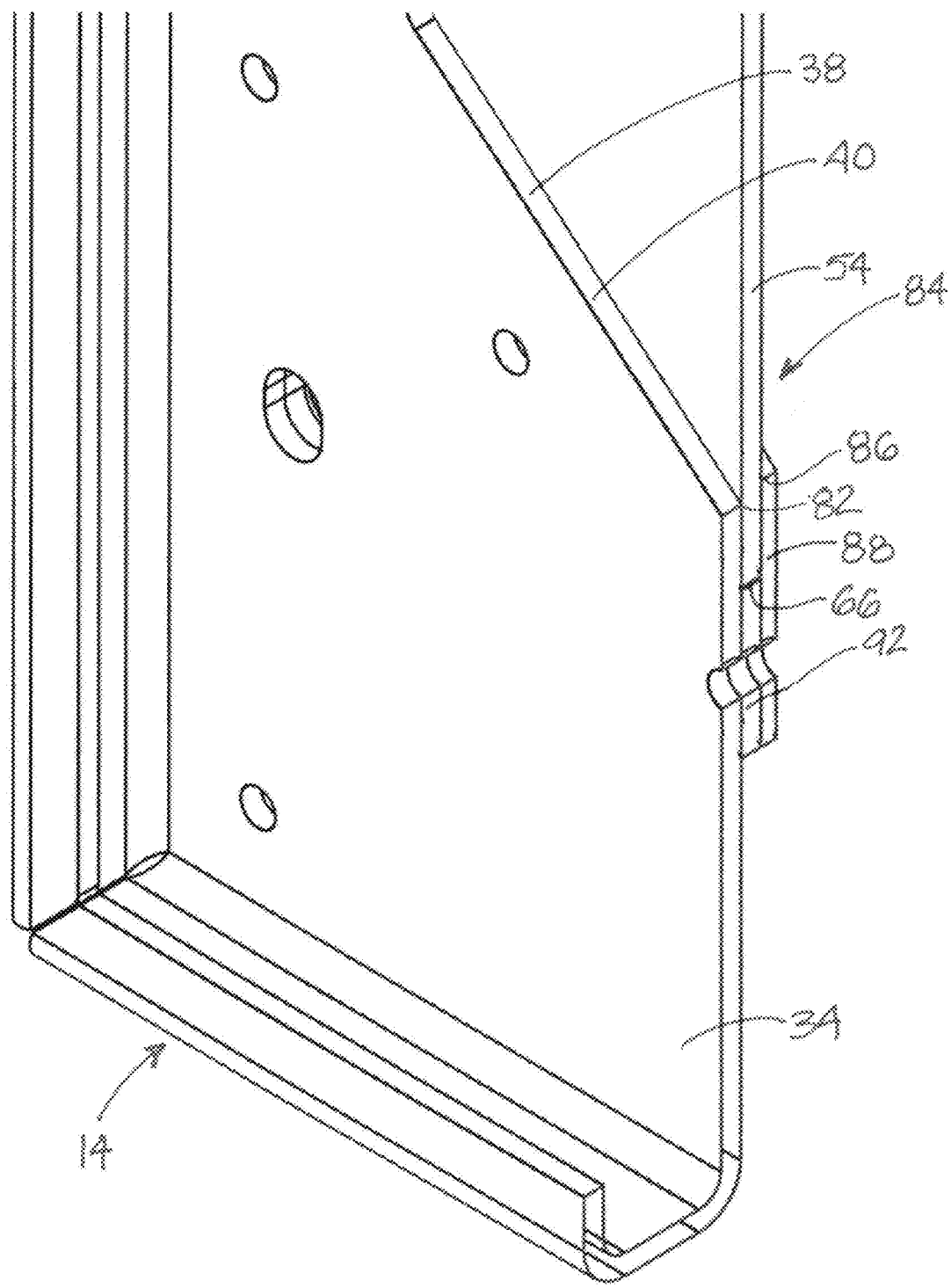
FIG. 7 is a schematic perspective sectional view of a lower portion of the system, taken along line 7-7 of FIG. 6, with the gate structure in the closed position, according to an illustrative embodiment.

In some highly advantageous embodiments of the disclosure, such as shown, for example, in FIGS. 6 and 7, the lower edge portion 66, 68 of the perimeter edge bypass the lower perimeter portions 40, 42 of the edge of the threshold plate forming the opening perimeter when the gate structure 12 moves toward the closed position, to form a first shear point 82 that facilitates the shearing of plant material that may extend through the passage opening 16 when the gate structure 12 is moved toward the closed position.

In some embodiments, the guide frame assembly 14 may include a positioning structure 84 which is configured to help hold the gate plate 54 against the threshold plate 34 when the gate plate 54 moves toward and is in the closed position. The positioning structure 84 may comprise a positioning plate 88 which is configured to be positioned in an abutted condition against the gate plate 54 when the gate structure is in the closed position. The positioning plate 88 may form a second shear point 86 (see FIG. 7) with the gate plate 54 as the gate structure moves toward the closed position, and the second shear point may also facilitate shearing of plant material extending through the passage opening when the gate structure is moved toward the closed position. The positioning plate 88 may be spaced from the threshold plate to form a plate gap 90 for receiving a portion of the gate plate when the gate structure is positioned in the closed position. In embodiments, the positioning structure 84 may include a pair of the positioning plates 88, 89. The positioning structure 84 may further include a spacer plate 92 positioned between the positioning plate 88 and the threshold plate 34. The spacer plate 92 may also perform as a stop for the lower edge portions 66, 68 of the gate plate when the gate structure is in the closed position, or moving toward the closed position.

Figure 11:
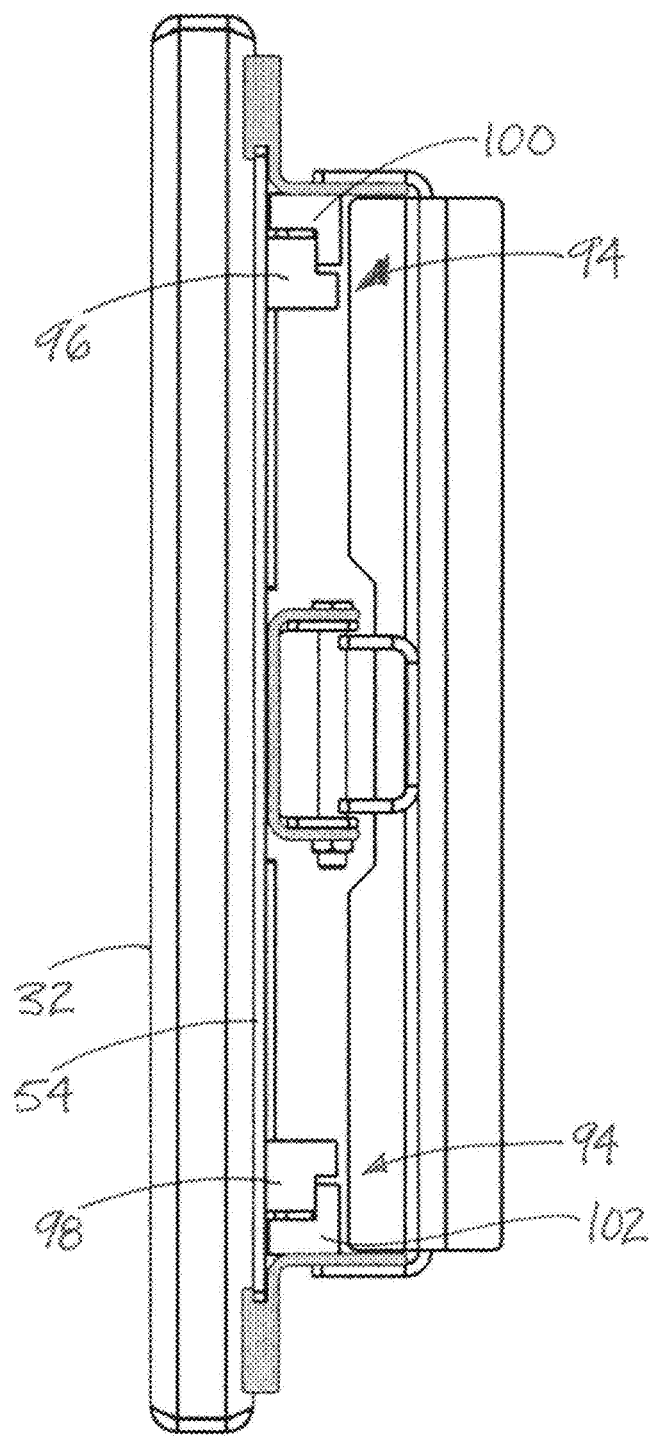
FIG. 11 is a schematic sectional view of the lower portion of the system, taken along line 11-11 of FIG. 4, showing further detail of the gate securing wedging assembly, according to an illustrative embodiment.

The system 1 may also include a gate securing wedging assembly 94 which is configured to enhance a closure of the passage opening 16 by the gate structure 12, such as by enhancing the seal between the gate structure 12 and the guide frame assembly 14 when the gate structure is in the closed position. The gate securing wedging assembly 94 may be configured to bias the gate plate 54 towards the threshold plate 34 as the gate structure 12 moves toward the closed position. In the illustrative embodiments, such as shown in FIG. 11, the gate securing wedging assembly 94 may include gate wedges 96, 98 which are positioned on the gate structure 12, and each of the gate wedges may be positioned toward one of the side edge portions 72, 74 of the gate plate. The gate securing wedging assembly 94 may further include threshold wedges 100, 102 which are positioned on the gate threshold 32, and each of the threshold wedges may be positioned adjacent to one of the side perimeter portions 46, 48 of the opening perimeter. The gate wedges 96, 98 may be positioned between the threshold wedges 100, 102 and the gate plate 54 when the gate structure is in the closed position. In the closed position of the gate structure, each one of the threshold wedges 100, 102 may press progressively more against a respective one of the gate wedges 96, 98 as the gate structure moves towards the closed position along the guide path of movement. Each of the wedges may comprise a block of material with a varying thickness and sloping contacting surfaces to achieve the progressively greater pressure toward the closed position.

Embodiments of the system 1 may further include a gate operator assembly 104 which is configured to control movement of the gate structure 12 along the track formed by the guide frame assembly 14. In some highly advantageous embodiments, the gate operator assembly 104 may be configured to lift the gate structure 12 from the closed position toward the open position in a relatively controlled manner, and release the gate structure to fall under the influence of gravity (and otherwise uncontrolled by the operator assembly) to the closed position, which may increase the speed of the movement of the gate structure into the closed position and facilitate the severing of any plant material extending through the passage opening when the gate structure is desired to be closed.

Figure 8:
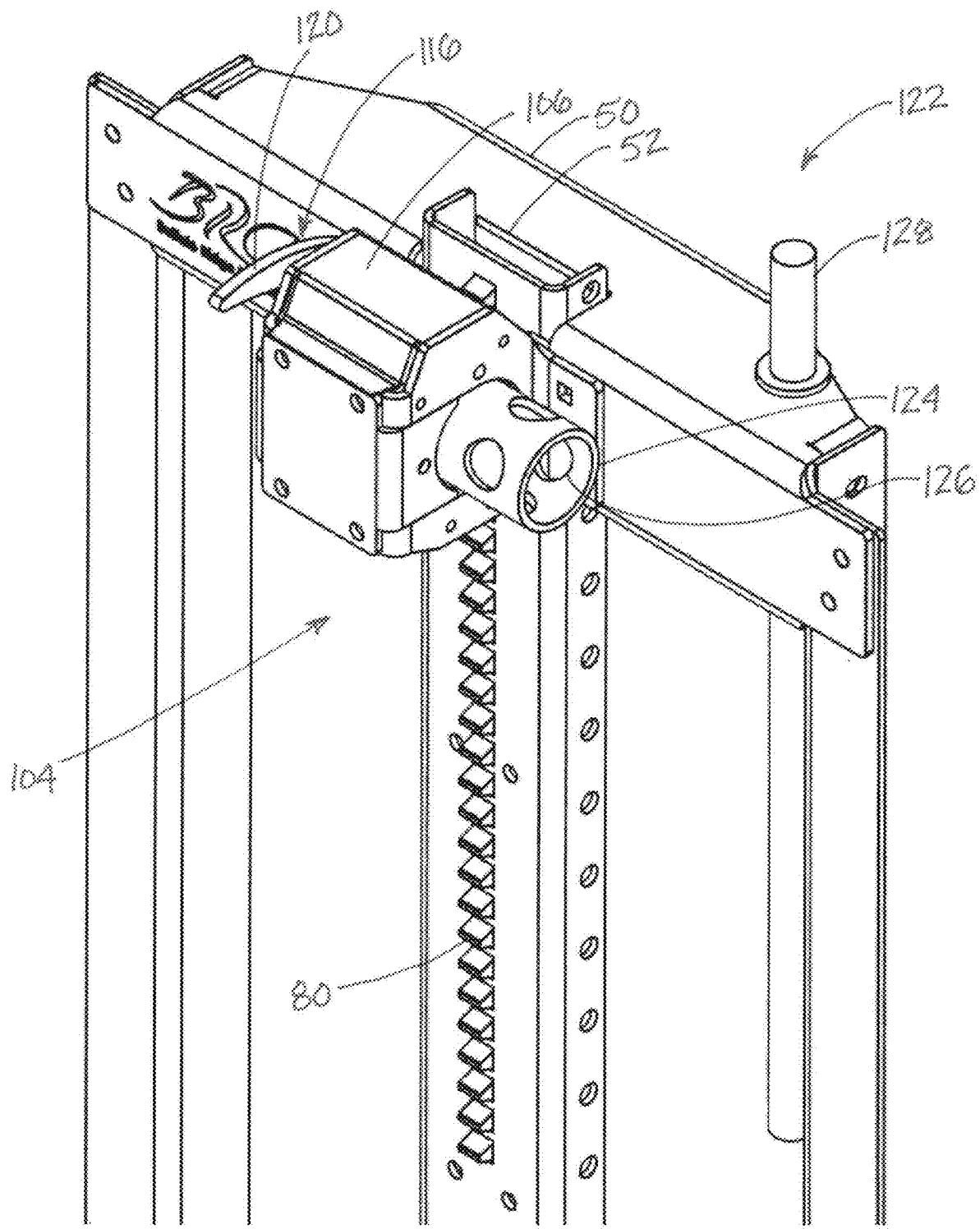
FIG. 8 is a schematic perspective view of an upper portion of the system showing detail of the gate operator assembly, according to an illustrative embodiment.
Figure 9:
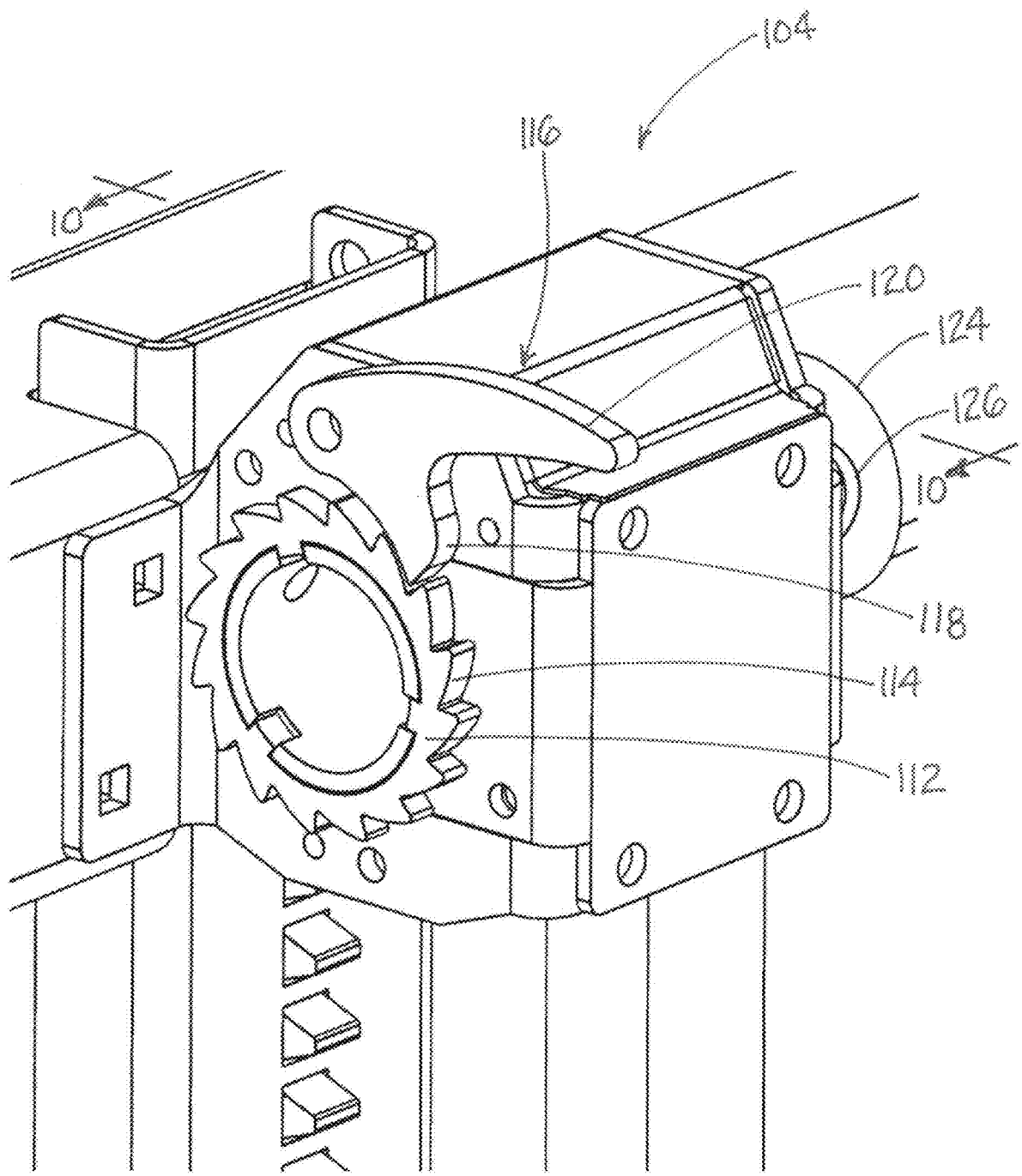
FIG. 9 is a schematic perspective view of elements of the gate operator assembly, according to an illustrative embodiment.
Figure 10:
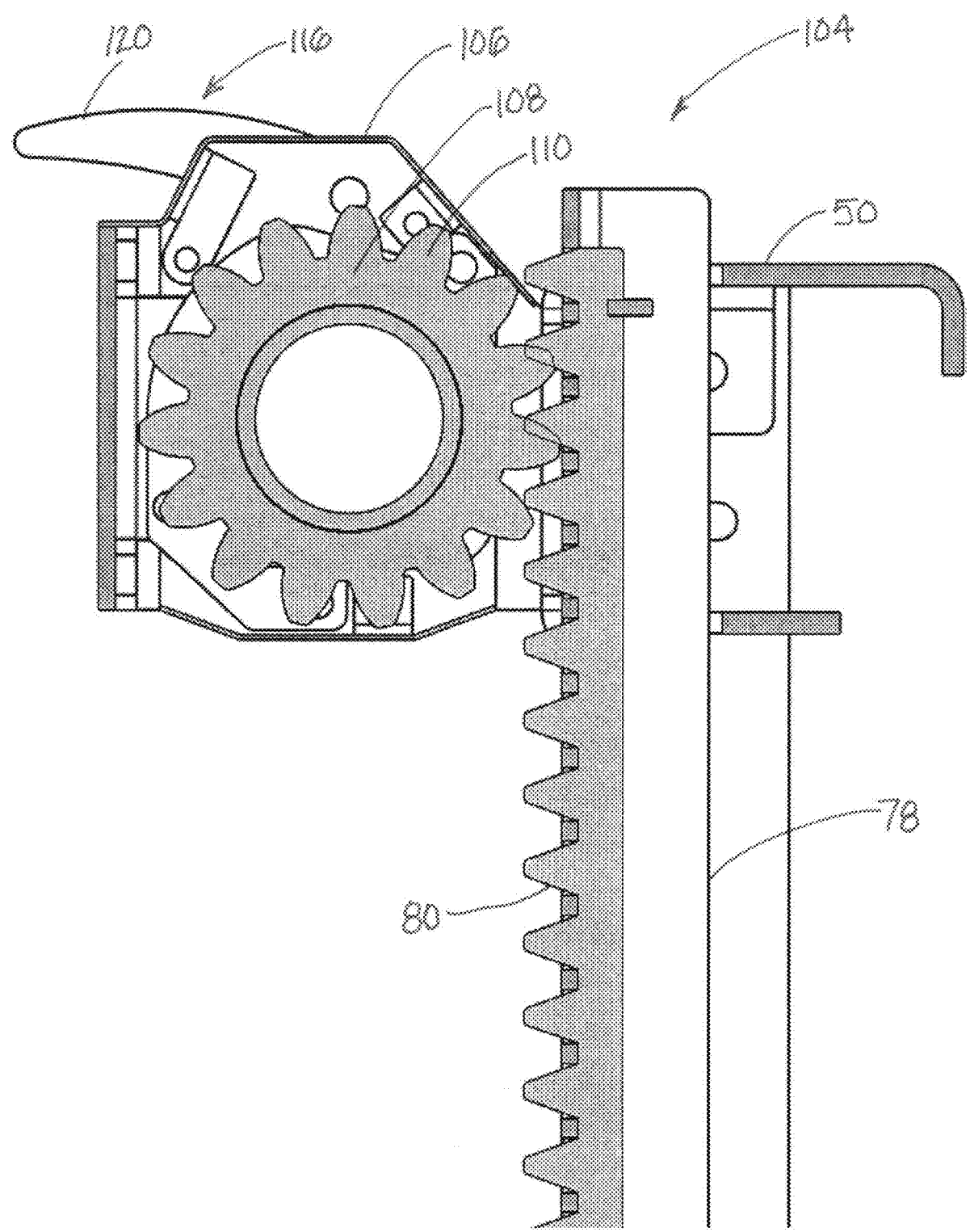
FIG. 10 is a schematic sectional view of the upper portion of the system, taken along line 10-10 of FIG. 9, showing further detail of the gate operator assembly, according to an illustrative embodiment.

In some illustrative embodiments, such as shown in FIGS. 8 through 10, the gate operator assembly 104 may comprise a housing 106 which is mounted on the guide frame assembly 14, such as on the cross member 50 of the assembly 14. The housing 106 may define an interior. The gate operator assembly 104 may also comprise a toothed wheel 108 which is rotatably mounted on the cross member 50, and may be positioned within the housing 106. The toothed wheel 108 may have a plurality of teeth 110 which are engageable with the toothed rack 80 on the gate stem 78. The gate operator assembly may further include a ratchet gear 112 which is rotatable as a unit with the toothed wheel 108, and the ratchet gear may have a plurality of ratchet teeth 114.

The gate operator assembly 104 may comprise a pawl member 116 that is mounted on the housing 106 and that engages the ratchet gear 112 to permit or allow rotation of the ratchet gear 112 and the toothed wheel 108 in a first rotational direction and resist rotation in a second rotational direction. In embodiments, the first rotational direction of the wheel 108 corresponds to the operator assembly 104 moving the gate structure 12 toward the open position (and generally upwardly), and the second rotational direction corresponds to the operator assembly permitting the gate structure to move toward the closed position (and generally downwardly). The pawl member 116 may include a pawl section 118 which engages the teeth 110 of the ratchet gear and a handle section 120 permitting manual release of engagement of the pawl section from one of the ratchet teeth 114 of the ratchet gear. The pawl member 116 may be biased toward contact with the ratchet gear in any suitable manner, such as by a torsion spring. When the gate structure 12 is fully or partially in an open position, and an operator of the apparatus 10 desires to move the gate structure to a closed position, the pawl member 116 may be moved or pivoted so that the pawl section 118 of the pawl member moves out of engagement with the ratchet teeth 114 of the ratchet gear, and the weight of the gate structure, no longer restrained by the gate operator assembly 104, may permit the gate structure to move to the closed position in an unrestrained manner, which may assist in the severing of plant material in the passage opening 16.

The gate operator assembly 104 may include a leverage assembly 122 for facilitating the manual rotation of the ratchet gear 112 with respect to the housing 106 and the pawl member 116. The leverage element 122 may include a leverage wheel 124 which is rotatable with the toothed wheel 108 such that rotation of the leverage wheel is communicated to the toothed wheel. The leverage assembly 122 may also have a plurality of recesses 126 arranged along the perimeter of the leverage wheel 124. The leverage assembly 122 may also include a lever member 128 which is elongated and has a first end which is insertable into one of the recesses 126 of the leverage wheel to permit torque to be manually applied to the leverage wheel when force is applied to a second end of the lever member, such as by the hand of a person. Optionally, the lever member 128 may have a stored condition when the lever member is inserted into a hole in the cross member 50.

In some embodiments, the threshold plate 34 and the gate plate 54 may be formed of a corrosion resistant material, for example a metal such as stainless steel.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for selectively closing a fluid flow channel, the system comprising:
    a gate apparatus for selectively closing off flow in the fluid flow channel, the gate apparatus comprising:
        a gate structure and a guide frame assembly guiding movement of the gate structure between a closed position and an open position, the guide frame assembly defining a passage opening through which fluid in the fluid flow channel is selectively permitted to flow;
        wherein the guide frame assembly forms an elongated track guiding movement of the gate structure along a guide path of movement between the closed and open positions, the guide frame assembly including a gate threshold located toward a bottom end of the guide frame assembly, the gate threshold including a threshold plate defining the passage opening, the threshold plate having an opening perimeter forming the passage opening, the opening perimeter being formed by an edge of the threshold plate, the opening perimeter having a lower perimeter portion;
        wherein the gate structure includes a gate plate having a perimeter edge having a lower edge portion and a gate stem extending from the gate plate along at least a portion of the track;
        wherein the lower edge portion of the perimeter edge of the gate plate bypasses the lower perimeter portion of the edge of the threshold plate forming the opening perimeter when the gate structure moves toward the closed position to form a first shear point to shear any plant material extending through the passage opening when the gate structure is moved toward the closed position;
        wherein the perimeter edge of the gate plate includes a pair of the lower edge portions, the lower edge portions converging toward each other; and
        wherein the edge of the threshold plate includes a pair of the lower perimeter portions, the lower perimeter portions converging at a bottom of the passage opening.

2. The system of claim 1 additionally comprising a gate operator assembly configured to control movement of the gate structure along the track formed by the guide frame assembly, the gate operator assembly being configured to lift the gate structure from the closed position toward the open position and to release the gate structure to fall under the influence of gravity to the closed position.

3. The system of claim 2 wherein the gate operator assembly comprises:
    a toothed wheel rotatably mounted on the guide frame assembly, the toothed wheel having a plurality of teeth;
    a ratchet gear rotatable as a unit with the toothed wheel, the ratchet gear having a plurality of ratchet teeth;
    a pawl member mounted on the guide frame assembly and engaging the ratchet gear to permit rotation of the ratchet gear and the toothed wheel in a first rotational direction and resist rotation in a second rotational direction, the first rotational direction corresponding to the operator assembly moving the gate structure toward the open position, the second rotational direction corresponding to the operator assembly permitting the gate structure to move toward the closed position; and
    wherein the gate stem is elongated in a longitudinal direction of the stem, the gate stem defining a plurality of slots arrayed in a longitudinal direction of the stem with the slots each extending perpendicular to the longitudinal direction to be engaged by the teeth of the toothed wheel.

4. The system of claim 2 wherein the gate stem has a toothed rack extending along at least a portion of the gate stem; and
    wherein the gate operator assembly comprises:
        a toothed wheel rotatably mounted on the guide frame assembly, the toothed wheel having a plurality of teeth engageable with the toothed rack on the gate stem;
        a ratchet gear rotatable as a unit with the toothed wheel, the ratchet gear having a plurality of ratchet teeth;
        a pawl member mounted on the guide frame assembly and engaging the ratchet gear to permit rotation of the ratchet gear and the toothed wheel in a first rotational direction and resist rotation in a second rotational direction, the first rotational direction corresponding to the operator assembly moving the gate structure toward the open position, the second rotational direction corresponding to the operator assembly permitting the gate structure to move toward the closed position.

5. The system of claim 4 wherein the gate operator assembly additionally comprises a leverage assembly for facilitating the manual rotation of the ratchet gear and pawl member, the leverage assembly including:
    a leverage wheel with a plurality of recesses, the leverage wheel being rotatable with the toothed wheel such that rotation of the leverage wheel is communicated to the toothed wheel; and
    a lever member being elongated and having a first end insertable into one of the recesses of the leverage wheel to permit torque to be manually applied to the leverage wheel when force is applied to a second end of the lever member.

6. The system of claim 1 additionally comprising a gate securing wedging assembly configured to enhance a closure of the passage opening by the gate structure when the gate structure is in the closed position, the gate securing wedging assembly being configured to bias the gate plate towards the threshold plate as the gate structure moves toward the closed position.

7. The system of claim 6 wherein the gate securing wedging assembly comprises:

gate wedges positioned on the gate structure, each of the gate wedges being positioned adjacent to side edge portions of the perimeter edge of the gate plate; and threshold wedges positioned on the gate threshold, each of the threshold wedges being positioned adjacent to side perimeter portions of the opening perimeter;

wherein one of the threshold wedges presses against one of the gate wedges as the gate structure moves towards the closed position along the guide path of movement.

8. The system of claim 1 wherein the pair of the lower edge portions of the perimeter edge are straight in shape; and wherein the pair of the lower perimeter portions of the edge of the threshold plate are straight in shape.

9. The system of claim 1 wherein the guide frame assembly includes a pair of side members laterally spaced with respect to each other, the track being located between the side members, an auxiliary guide plate being mounted on each of the side members, each of the auxiliary guide plates defining a guide channel with the respective side member.

10. The system of claim 1 additionally comprising a positioning structure comprising a positioning plate configured to be positioned in abutment against the gate plate when the gate structure is in the closed position, the positioning plate being spaced from the threshold plate to form a plate gap for receiving a portion of the gate plate when the gate structure is positioned in the closed position.

11. The system of claim 10 wherein the gate plate and the positioning plate form a second shear point therebetween to facilitate shearing of plant material extending through the passage opening when the gate structure is moved toward the closed position.

12. The system of claim 10 wherein the positioning structure comprises a spacer plate positioned between the positioning plate and the threshold plate, the spacer plate forming a stop for the lower edge portion of the gate plate when the gate structure is in the closed position.

13. The system of claim 1 wherein the gate plate and the threshold plate are formed of stainless steel.

14. A system for selectively closing a fluid flow channel, the system comprising:

a gate apparatus for selectively closing off flow in the fluid flow channel, the gate apparatus comprising:

a gate structure and a guide frame assembly guiding movement of the gate structure between a closed position and an open position, the guide frame assembly defining a passage opening through which fluid in the fluid flow channel is selectively permitted to flow;

wherein the guide frame assembly forms an elongated track guiding movement of the gate structure along a guide path of movement between the closed and open positions, the guide frame assembly including a gate threshold located toward a bottom end of the guide frame assembly, the gate threshold including a threshold plate defining the passage opening, the threshold plate having an opening perimeter forming the passage opening, the opening perimeter being formed by an edge of the threshold plate, the opening perimeter having a lower perimeter portion;

wherein the gate structure includes a gate plate having a perimeter edge having a lower edge portion and a gate stem extending from the gate plate along at least a portion of the track;

wherein the lower edge portion of the perimeter edge of the gate plate bypasses the lower perimeter portion of the edge of the threshold plate forming the opening perimeter when the gate structure moves toward the closed position to form a first shear point to shear any plant material extending through the passage opening when the gate structure is moved toward the closed position;

a gate operator assembly configured to control movement of the gate structure along the track formed by the guide frame assembly, the gate operator assembly being configured to lift the gate structure from the closed position toward the open position and to release the gate structure to fall under the influence of gravity to the closed position;

wherein the gate operator assembly comprises:

a toothed wheel rotatably mounted on the guide frame assembly, the toothed wheel having a plurality of teeth;

a ratchet gear rotatable as a unit with the toothed wheel, the ratchet gear having a plurality of ratchet teeth;

a pawl member mounted on the guide frame assembly and engaging the ratchet gear to permit rotation of the ratchet gear and the toothed wheel in a first rotational direction and resist rotation in a second rotational direction, the first rotational direction corresponding to the operator assembly moving the gate structure toward the open position, the second rotational direction corresponding to the operator assembly permitting the gate structure to move toward the closed position; and wherein the gate stem is elongated in a longitudinal direction of the stem, the gate stem defining a plurality of slots arrayed in a longitudinal direction of the stem with the slots each extending perpendicular to the longitudinal direction to be engaged by the teeth of the toothed wheel.

15. A system for selectively closing a fluid flow channel, the system comprising:

a gate apparatus for selectively closing off flow in the fluid flow channel, the gate apparatus comprising:

a gate structure and a guide frame assembly guiding movement of the gate structure between a closed position and an open position, the guide frame assembly defining a passage opening through which fluid in the fluid flow channel is selectively permitted to flow;

wherein the guide frame assembly forms an elongated track guiding movement of the gate structure along a guide path of movement between the closed and open positions, the guide frame assembly including a gate threshold located toward a bottom end of the guide frame assembly, the gate threshold including a threshold plate defining the passage opening, the threshold plate having an opening perimeter forming the passage opening, the opening perimeter being formed by an edge of the threshold plate, the opening perimeter having a lower perimeter portion;

wherein the gate structure includes a gate plate having a perimeter edge having a lower edge portion and a gate stem extending from the gate plate along at least a portion of the track;

wherein the lower edge portion of the perimeter edge of the gate plate bypasses the lower perimeter portion of the edge of the threshold plate forming the opening perimeter when the gate structure moves toward the closed position to form a first shear point to shear any plant material extending through the passage opening when the gate structure is moved toward the closed position;

a positioning structure comprising a positioning plate configured to be positioned in abutment against the gate plate when the gate structure is in the closed position, the positioning plate being spaced from the threshold plate to form a plate gap for receiving a portion of the gate plate when the gate structure is positioned in the closed position;

wherein the gate plate and the positioning plate form a second shear point therebetween to facilitate shearing of plant material extending through the passage opening when the gate structure is moved toward the closed position; and wherein the positioning structure comprises a spacer plate positioned between the positioning plate and the threshold plate, the spacer plate forming a stop for the lower edge portion of the gate plate when the gate structure is in the closed position.

16. The system of claim 15 wherein the perimeter edge of the gate plate includes a pair of the lower edge portions, the lower edge portions converging toward each other; and wherein the edge of the threshold plate includes a pair of the lower perimeter portions, the lower perimeter portions converging at a bottom of the passage opening.

17. The system of claim 16 wherein the pair of the lower edge portions of the perimeter edge are straight in shape; and wherein the pair of the lower perimeter portions of the edge of the threshold plate are straight in shape.

18. The system of claim 15 additionally comprising a gate operator assembly configured to control movement of the gate structure along the track formed by the guide frame assembly, the gate operator assembly being configured to lift the gate structure from the closed position toward the open position and to release the gate structure to fall under the influence of gravity to the closed position, the gate operator assembly comprising:

a toothed wheel rotatably mounted on the guide frame assembly, the toothed wheel having a plurality of teeth;

a ratchet gear rotatable as a unit with the toothed wheel, the ratchet gear having a plurality of ratchet teeth;

a pawl member mounted on the guide frame assembly and engaging the ratchet gear to permit rotation of the ratchet gear and the toothed wheel in a first rotational direction and resist rotation in a second rotational direction, the first rotational direction corresponding to the operator assembly moving the gate structure toward the open position, the second rotational direction corresponding to the operator assembly permitting the gate structure to move toward the closed position; and wherein the gate stem is elongated in a longitudinal direction of the stem, the gate stem defining a plurality of slots arrayed in a longitudinal direction of the stem with the slots each extending perpendicular to the longitudinal direction to be engaged by the teeth of the toothed wheel.

* * * * *